(12) United States Patent
Hao et al.

(10) Patent No.: US 7,317,706 B1
(45) Date of Patent: Jan. 8, 2008

(54) FAIR SHARE SCHEDULING METHOD IN A CDMA PAGING SYSTEM

(75) Inventors: Qi Hao, Ottawa (CA); Xiao-Dong Li, Nepean (CA); Patrick Lie Chin Cheong, Nepean (CA); David Wilson, Nepean (CA)

(73) Assignee: Nortel Networks Limited, St. Laurent, Quebec (CA)

( * ) Notice: Subject to any disclaimer, the term of this patent is extended or adjusted under 35 U.S.C. 154(b) by 909 days.

(21) Appl. No.: 10/732,307

(22) Filed: Dec. 11, 2003

(51) Int. Cl.
*H04Q 7/00* (2006.01)

(52) U.S. Cl. ............ 370/330; 455/450; 455/451; 455/452.1; 455/452.2; 455/453; 370/329; 370/335; 370/337; 370/436; 370/458; 370/459

(58) Field of Classification Search ............ 455/450, 455/451, 452.1, 452.2, 453; 370/329, 330, 370/335, 436, 443, 455, 458, 459, 460, 461
See application file for complete search history.

(56) References Cited

U.S. PATENT DOCUMENTS

| | | | | |
|---|---|---|---|---|
| 6,101,193 A | * | 8/2000 | Ohba | 370/429 |
| 6,141,336 A | * | 10/2000 | Bauchot et al. | 370/348 |
| 6,148,324 A | * | 11/2000 | Ransom et al. | 718/105 |
| 6,748,220 B1 | * | 6/2004 | Chow et al. | 455/450 |
| 6,807,426 B2 | * | 10/2004 | Pankaj | 455/453 |
| 6,993,339 B2 | * | 1/2006 | Skillermark et al. | 455/447 |
| 7,233,584 B2 | * | 6/2007 | Nguyen et al. | 370/337 |

* cited by examiner

*Primary Examiner*—Rafael Perez-Gutierrez
*Assistant Examiner*—Olumide Ajibade-Akonai
(74) *Attorney, Agent, or Firm*—Jeffrey M. Measures; Borden Ladner Gervais LLP

(57) ABSTRACT

A method for scheduling messages transmitted on a forward common channel of a CDMA system. The method includes determining the ratio between the slotted and unslotted messages transmitted over the forward common channel over a period of time. For each time slot S(i) of the forward common channel, s % time is allocated from the duration of the time slot to slotted messages and u % time is allocated from the duration of the time slot to unslotted messages. The s % time and u % time are determined based on the ratio between the slotted and unslotted messages transmitted over the forward common channel over a period of time.

12 Claims, 5 Drawing Sheets

FAIR SHARE SCHEDULING METHOD IN A CDMA PAGING SYSTEM

BACKGROUND OF THE INVENTION

1. Field of the Invention

The present invention is directed to radio communications systems, and more particularly to a method of allocating slot share to unslotted and slotted messages in a CDMA (code division multiple access) paging system.

2. Description of the Prior Art

Modern wireless systems using wideband multiple access technologies (e.g. wideband CDMA referred to as W-CDMA or CDMA2000) effectively handle large variety of services, such as analog (voice) and data services. The link between a mobile user (MU) station and a base transceiver station (BTS) in a CDMA system is a multiple radio access channel, where users share the same physical radio channel (i.e. the signals transmitted by a MU occupy the same bandwidth as the signals transmitted by other MUs in the respective cell), each MU being uniquely identified by a spreading code. The forward CDMA channel (from the BTS to the MUs) is the sum of the forward pilot channel, the forward synchronization channel, one or more forward common (overhead control signalling) channels, and a plurality of forward user traffic channels that are each modulated with a distinct channel code and are combined with a PN spreading sequence. The reverse CDMA channel (from the MU to the BTS) is the sum of one or more reverse access channels and many reverse user traffic channels that are each modulated with a unique channel code and are combined with a specific PN spreading sequence.

The forward common channel is partitioned into time slots that have specified beginning and ending times, each MU being assigned a time slot once it gained access to the system. During the idle state, the MU may monitor particular slots such as its assigned slot, and sleep the rest of the time to save battery life. This mode of operation is referred to as the slotted mode. The MU may also operate in an unslotted mode, wherein it monitors all slots; this happens when the mobile operates to access the system. As such, the forward common channel transmits both slotted and unslotted messages. For each of the slotted and unslotted messages there can be primary (new) and repeat messages (i.e. messages that were not transmitted in the previous time slot or in a previous slot cycle for slotted messages).

Frames of data must be uniformly transferred from the BTS to the MU's. Thus, a scheduler for the common channels, such as paging channel (PCH) or forward common control channel (FCCCH) arranges and formats the sporadic and periodic messages into a uniform stream of data frames. The scheduler receives the messages generated by the BTS (base transceiver station) controller, arranges them according to a priority scheme and uniformly transfers them to a modulator for transmission. The overhead (OVH) messages have a top priority and as such must be scheduled periodically, while the slotted and unslotted messages are provided to the scheduler sporadically, as they are created. Currently, these messages are arranged into two separate groups (queues); the slotted messages have a second, compared to OVH messages, but qualified priority, while the unslotted messages have the lowest priority. The repeat messages take priority over the primary messages within each of the slotted and unslotted message groups.

With the advent of short messaging services (SMS), enhanced messaging services (EMS) and multimedia messaging services (MMS), the forward common channels (PCH or FCCCH) are expected to carry more traffic. In addition, paging traffic volume mix pattern and bursts for both slotted and unslotted messages vary over time. As the forward common channel traffic increases both in terms of messages to be scheduled and in the size of the messages, the current scheme of assigning a higher priority to the slotted message results in a high drop rate and delays for unslotted messages, and thus in difficulties for a subscriber to gaining access to the wireless system. CDMA call setup success rate and delay heavily depend on how efficiently the paging messages are scheduled, especially for unslotted messages, which are mostly comprised of call setup messages.

In order to address these issues, it has been proposed to set an indicator for the unslotted messages queue, to advise when the queue length exceeds a given threshold. However, this scheme does not provide a balance between the slotted and unslotted queue processing priorities and does not provision for how to resolve the unslotted messages queue when the threshold is surpassed. As a result, it may result in higher drop rates and delays for slotted messages when a large volume of slotted messages is injected into the system. There is also an issue regarding how to determine the threshold under varying traffic patterns. If it is too small, its use will degrade performances for slotted and overall paging messages. If it is too large, the improvement in the processing speed of the unslotted messages could be minimal.

What is needed therefore is an intelligent method of scheduling the slotted and unslotted messages transmitted over a forward common channel, which achieves a lower paging drop rate and delay.

SUMMARY OF THE INVENTION

It is an object of the invention to alleviate totally or in part the disadvantages of the prior art solutions.

The present invention provides a mechanism to optimize the capacity allocation available on the forward common channel of a CDMA system between the unspotted and slotted messages.

The present invention further provides a mechanism to prioritize the messages according to their relevance to the call set-up processing, so that higher priority messages gain preferential treatment, which ultimately results in improving call-setup performance of the system.

The present invention still further provides a mechanism to optimize operation of the forward common scheduler when dealing with large messages, such that smaller size messages do not suffer unacceptable delays.

In one aspect the invention provides a method for scheduling messages transmitted on a forward common channel of a CDMA system comprising: determining the ratio between the slotted and unslotted messages transmitted over said forward common channel over a period of time; and for each time slot S(i) of said forward common channel, allocating s % time from the duration of said time slot to slotted messages and u % time from the duration of said time slot to unslotted messages, where s % and u % are determined based on said ratio.

In a further aspect, the invention provides a method for scheduling messages transmitted on a forward common channel of a CDMA system, comprising: at the beginning of each time slot S(i) of said forward common channel arranging all new messages according to a respective call arrival time and a message arrival time into a slotted messages queue SQ and an unslotted messages queue UQ; and arranging all repeat unslotted messages into a repeat unslotted messages queue RUQ.

In a still further aspect, the invention provides a message scheduling system for a forward common channel of a CDMA system comprising: a traffic generator for arranging all new sporadic messages in the order of the arrival of a call request and in the order of the arrival of said message, a scheduler for separating said new sporadic messages into slotted and unslotted messages and scheduling for transmission both slotted messages and unslotted messages in each time slot S(i) of said forward common channel.

Advantageously, the invention provides significant performance gains for unslotted messages in terms of delays and drop rates, while maintaining the delays for slotted messages unchanged at low to medium loads, and slightly lower at higher loads.

As well, the invention maintains the overall performance of the system (in terms of channel utilization, drop rate and delay) at low to medium loads and provides a better performance at higher loads. Furthermore, it provides a solution for the large message scheduling and operates with diverse traffic loads and patterns.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

Some terms are defined next for convenience. The term "space" is used to identify the length of transmission time for a message. The term "fair-share" (FS) is used for the method according to the invention and specifies that time is allocated not only to the slotted messages, but also to the unslotted messages. The term "overall messages" refer to all messages transmitted on the respective PCH (OVH, slotted, and unslotted). The term "baseline method" refer to the scheduling method used currently for CDMA2000 systems.

Figure 1:
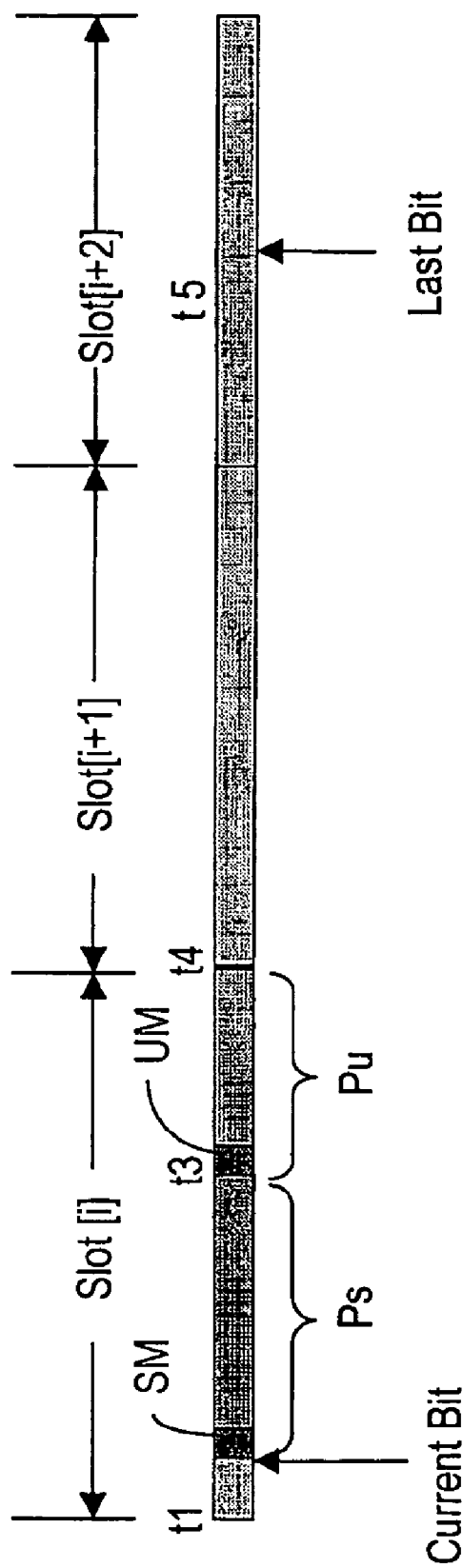
FIG. 1 is a diagram showing slot space partitioning according to the invention.

FIG. 1 illustrates an example of the slot time partitioning according to the invention. According to the invention, allocation of time in a slot may be static (predefined) or dynamic. The static allocation gives a percentage of the space in the slot to the unslotted messages and the percentage is determined taking into the account the traffic profile. As illustrated for time slot S(i), slotted messages SM are allocated s % and the unslotted messages UM receive u % of the transmission time. Thus, based on the current calculated real time traffic ratio, the slotted messages receive: a Lsm=s %·(t4−t1), as shown by the interval t1 to t3. Similarly, the unslotted messages receive: Lum=u %·(t4−t1), as shown by the interval t3 to t4.

At the start of the slotted/unslotted messages period, the respective messages are sent in the order of their priority index PI, from high to low. We denote the slot space allocated to the slotted messages with Ps and the slot space allocated to the unslotted messages with Pu, Ps+Pu=100%, where Ps and Pu are upper bounds. In this way, any space left in the Ps may be used for the unslotted/slotted messages.

Allocation of time in the respective slots may also be dynamic. In this case, the allocation is calculated based on the length of the queues at the beginning of S(i). If we denote with SQi the queue length for the slotted messages at the beginning of S(i) and with UQi the queue length for the unslotted messages, the ratio between these lengths is used to allocate the space in the slot.

$$A = \frac{SQi}{UQi}$$

The length of each queue is evaluated by the total number of bits in the messages making up the queue. In this case, the percentage allocated to the slotted messages is s %=A/(A+1), and the percentage allocated to the unslotted messages is u %=1/(A+1).

Figure 2A:
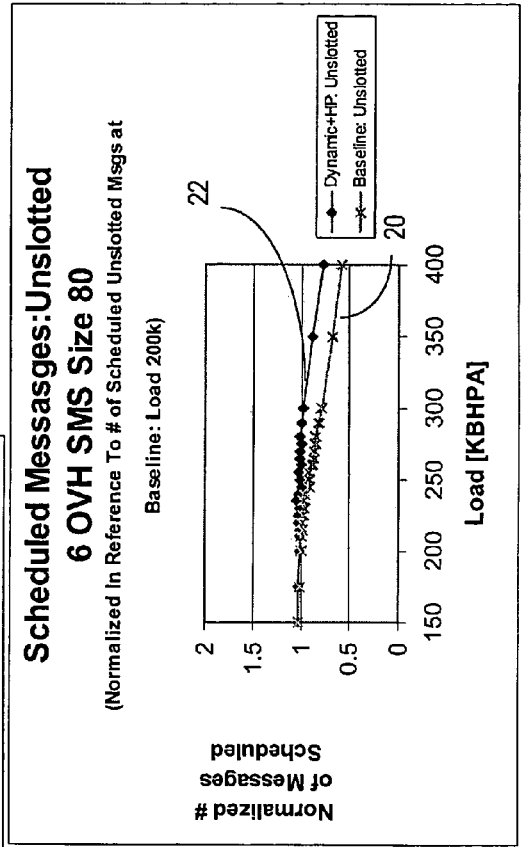
FIGS. 2A and 2B are graphical comparisons between the number of messages scheduled with the current methods and the method according to the invention. The graph of FIG. 2A shows the slotted and overall messages versus channel load and the graph of FIG. 2B shows the unslotted messages versus the channel load.
Figure 2B:
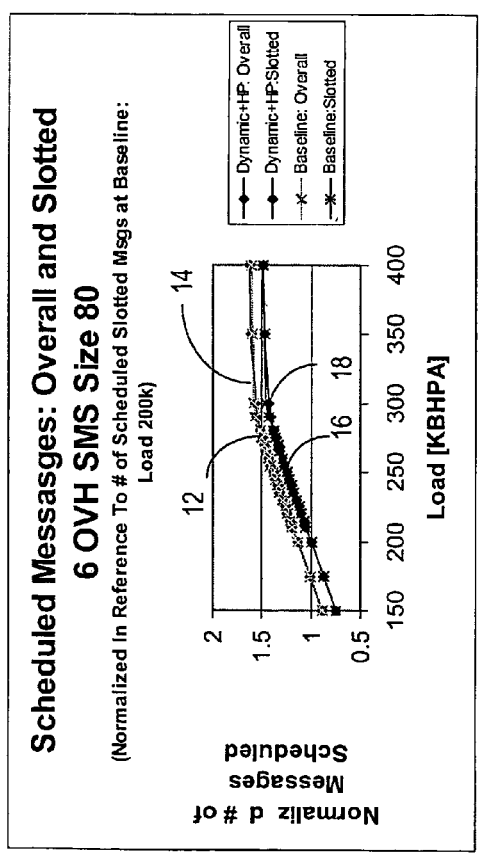

FIGS. 2A and 2B illustrate the performance for the unslotted messages with the dynamic fair-share method of the invention and with the current scheduling method. In both graphs, the channel load is estimated for the broadcasting message load (slotted message load) with the same number of overhead messages (six) and the same size of the SMS messages (80 bytes). These FIGS. 2A and 2B show modeling of the relative difference gains between the scheduler of the present invention and the baseline scenario and therefore reveals the gain achievable by the present invention.

FIG. 2A shows the normalized values of the total number of scheduled messages in relation to the number of scheduled slotted messages at a baseline scheduling system for a 200k load. FIG. 2B shows the normalized values of number of scheduled unslotted messages in relation to the number of scheduled unslotted messages at a baseline system at a 200k load. Graph 12 on FIG. 2A shows the number of messages scheduled versus the channel load for the overall messages with the baseline scheduling method and graph 14 shows the number of scheduled messages versus channel load for the overall messages with the dynamic fair-share scheduling method of the invention. Graph 16 illustrates the slotted messages scheduled with the baseline method, and graph 18, the slotted messages scheduled with the dynamic fair-share method. It is apparent from FIG. 2A that the number of slotted messages and the number of overall messages are practically unchanged for the current scheduling method and the dynamic fair-share method of the invention.

Graph 20 on FIG. 2B shows the number of unslotted messages scheduled versus the channel load, baseline method, and graph 22 illustrates the number of unslotted messages scheduled versus the channel load with the dynamic fair-share scheduling method of the invention. It is apparent that more unslotted messages are scheduled with the present invention.

In addition to the increase in the number of the unslotted messages scheduled, the performance of the unslotted messages is improved significantly when the paging load or SMS penetration increases, where the SMS penetration is measured as the SMS arrival rate per cell divided by the total IS95 call setup arrival rate plus the total IS2000 voice call setup arrival rate increases.

Figure 3:
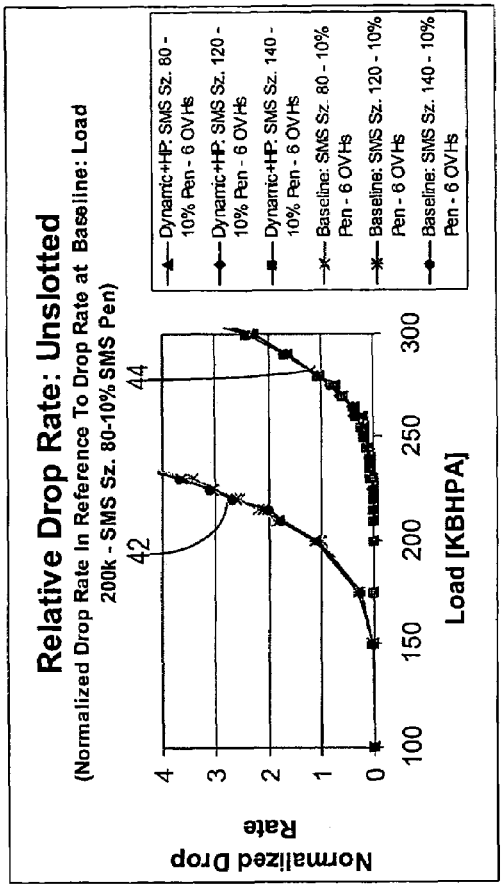
FIG. 3 is a graphical comparison between the delays obtained with the current method and with the method according to the invention for various SMS sizes.

FIG. 3 illustrates a delay-load graph (simulation) for the unslotted messages, when the channel carries six scheduled overhead messages and a SMS penetration of 10%. All the unslotted delays are normalized in relation to unslotted message delay for a baseline system with SMS size of 80 bytes and 10% of SMS penetration at a 240k load. Here, graphs 30, 32, and 34 show the results obtained with the baseline scheduling method when the size of the SMS messages is 80 bytes, 120 bytes and 140 bytes, respectively. The results obtained with the dynamic fair-share method of the invention are shown by graphs 36, 38, 40, prepared for the same SMS penetration (10%) and sizes (80, 120, 140). It is clear from FIG. 3 that while the current scheduling method induces unslotted messages delays that grow with the paging load and the SMS size, the dynamic fair-share scheduling is evidently impacted less by the paging load or SMS size increment.

Furthermore, TABLE 1 below shows that the delays with the dynamic fair-share scheduling method are 3 to 260 times smaller than the delays obtained with the current method. TABLE 1 also confirms that the improvement in the performance for the unslotted messages grows with the load. In TABLE 1, "Utilization" is measured as the actually transmitted data rate on a channel (bits per second) divided by the channel rate (bits per second).

TABLE 1

| Load | Utilization | Delay with dynamic FS sch. | Delay with baseline sch. | Ratio |
| --- | --- | --- | --- | --- |
| 230 | 80 | 0.15 | 0.49 | 3.284 |
| 255 | 85.5 | 0.22 | 1.18 | 5.317 |
| 300 | 91 | 0.52 | 133.49 | 259.172 |

Figure 4:
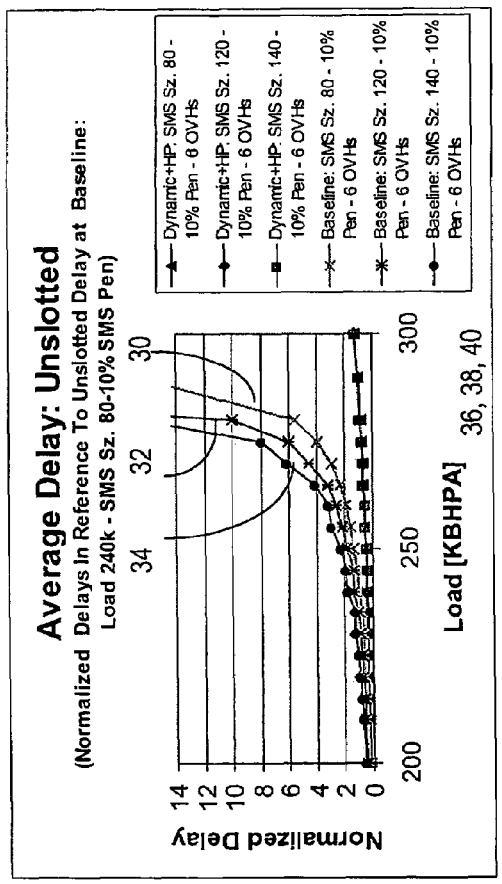
FIG. 4 is a graphical comparison between the drop rates obtained with the current method and with the method according to the invention for various SMS sizes.

FIG. 4 illustrates a drop rate-load simulation for the unslotted messages, where all the drop rates are normalized in relation to relative unslotted drop rate for a baseline system with SMS size 80 bytes and 10% of SMS penetration at a 200k load. Graph 42 shows the results obtained with the current scheduling method and graph 44 shows the results obtained with the dynamic fair-share method of the invention. Graph 44 shows a significantly better drop rate. It is also to be mentioned that the drop rate does not change significantly with the size of the SMS messages. FIG. 4 shows the results for three sizes (80, 120 and 140), but the graphs overlap substantially. TABLE 2 below provides the ratio between the drop rates for the baseline and dynamic fair-share scheduling methods for the same loads and utilization values as in TABLE 1. As in TABLE 1, "Utilization" is measured as the actually transmitted data rate on a channel (bits per second) divided by the channel rate (bits per second).

TABLE 2

| Load | Utilization | Drop rate with dynamic FS sch. | Drop rate with baseline sch. | Ratio |
| --- | --- | --- | --- | --- |
| 230 | 80 | 0.10 | 5.66 | 58.056 |
| 255 | 85.5 | 0.35 | 10.74 | 30.364 |
| 300 | 91 | 3.69 | 19.62 | 5.321 |

Figure 5:
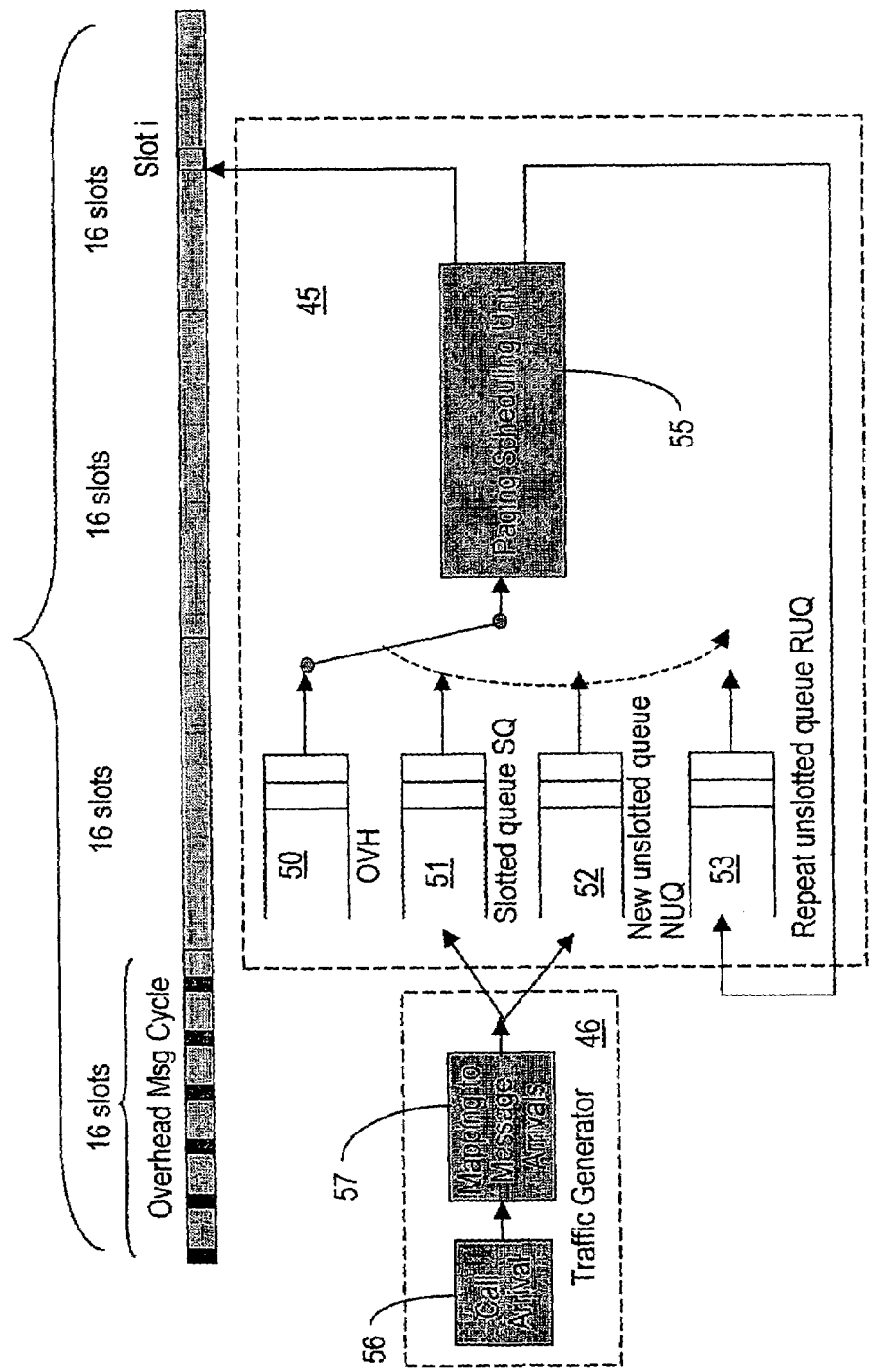
FIG. 5 is a diagram showing the architecture of the scheduler according an embodiment of the invention.

FIG. 5 shows the architecture of the paging system of the invention, illustrating a paging scheduler 45 that receives messages from a traffic generator 46. The scheduler 45 comprises a paging scheduling unit 55 fed by message queues 50-53. Thus, the overhead queue 50 has a 16-slot cycle; the overhead messages, which have the highest priority, must be scheduled first if they are due while scheduling slotted or unslotted messages in each slot. The slotted messages form a queue SQ 51 for each slot, while the new unslotted messages form a queue NUQ 52 for each forward common channel. Traffic generator 46 arranges the messages within the respective queue 51, 52 in the order of the call arrival, as shown at 56 and of message arrival, as shown at 57. The repeat unslotted messages, which have a higher priority than the first-time or new unslotted messages, form a queue RUQ 53, also for each slot. The repeat unslotted messages are arranged in queue 53 and they are output by the scheduling unit 55.

Proportional scheduling of the slotted and unslotted messages with reserved space for the unslotted messages provides for the advantages shown above in FIGS. 2-4. In addition, within each queue 51, 53, the higher priority messages (HPM) are scheduled first and transmitted first. The HPMs are for example (stale) messages reaching max_moves in slotted and unslotted queues, or messages that are farther away in a queue with respect to a threshold (watermark) for overly long queues.

Figure 6:
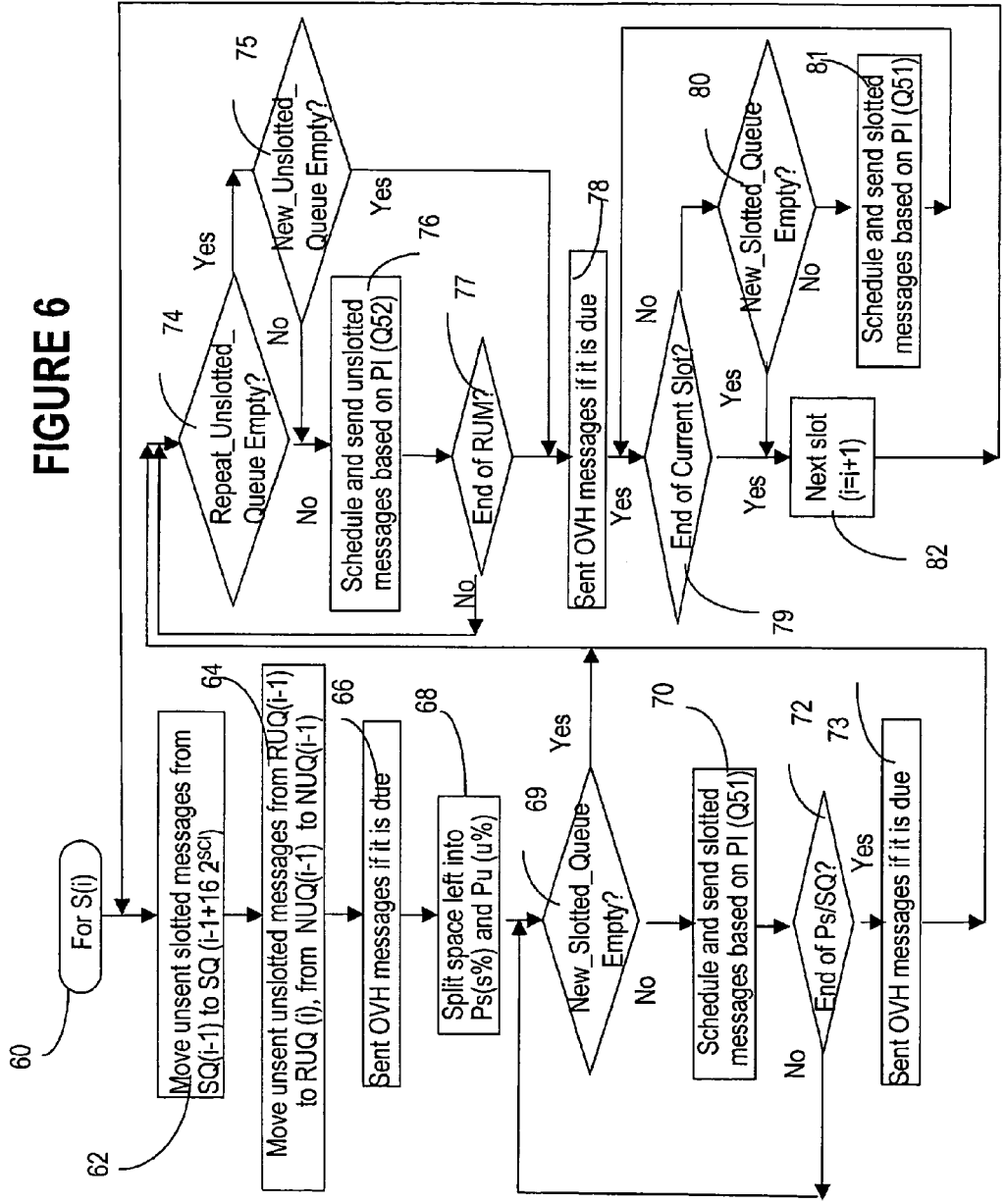
FIG. 6 is a flowchart illustrating the dynamic fair-share scheduling method according to an embodiment of the invention.

FIG. 6 illustrates the flowchart of the dynamic fair-share method according to the invention. The steps below are performed while the current bit to be transmitted is within slot S(i), as shown at 60.

Step 62. The messages from the slotted queue SQ(i−1) that could not be transmitted during the previous time slot are placed in the SQ(i−1+16*$2^{SCI}$) 51, the queue for next slot cycle.

Step 64. Similarly, the unsent messages from the unslotted message queue RUQ 53 and NUQ 52 of the previous slot S(i−1) are moved to the repeat unslotted queue RUQ 53 and to the new unslotted queue NUQ 52 for slot S(i).

Steps 66, 68. The overhead messages that have the highest priority are checked and transmitted at the beginning of the slot if the overhead messages are due for transmission, and the space left in the slot is divided into Ps (s % of the remainder of the slot after the OVH messages have been sent) and Pu (u %).

Steps 69, 70, 72. The scheduler operates in the slotted mode, where it sends slotted messages for a duration Ps. The high priority slotted messages HPM are send first; once all HPM slotted messages were sent, the scheduler sends the reminder of the slotted messages from queue 51, in the order of their priority, while checking that the current bit is still in Ps space.

Step 73. Once all slotted messages have been sent, or the current bit reached the end of Ps space, as shown by step 72, the scheduler checks the overhead message and schedules it if it is due. The scheduler then begins operation in the unslotted mode.

Steps 74, 75, 76, 77. The scheduler operates in the unslotted mode, where it sends unslotted messages until the end of the queues 52, 53 or the end of slot S(i). The HPM unslotted messages are send first in order of their priority. For example, the messages in queue 53 have a higher priority over the messages in queue 52. Once all HPM slotted messages were sent, the scheduler sends the unslotted messages from queue 52, also in the order of their priority, as shown in blocks 74-76, while checking that the current bit is still in the S(i) space.

Step 78. After sending unslotted messages, the scheduler checks and schedules an OVH message if the OVH messages are due, as shown by decision block 78.

Steps 79, 80, 81. If the end of slot has not been reached after scheduling unslotted messages, the scheduler will schedule unsent slotted messages in slot S(i) until the end of the slot or until there are no more slotted messages in the slot S(i).

Steps 82. Once the end of the slot has been reached, branch "yes" of decision block 79, the scheduler 45 begins transmission of the messages of the next slot S(i+1).

Message priorities for mobile directed messages differ by message type. The present invention also proposes to allocate a priority index PI. The index may be chosen to be directly proportional with the priority (the higher the priority, the higher the index). Thus, the sector-based messages receive a higher priority than zone based ones in order to achieve shorter call setup delays, without affecting too much the overall system message delays. TABLE 3 below shows that all unslotted messages are sector based and will have a PI of 2, while most slotted messages are system based and take a PI of 1. PI is taken into account by the scheduler 45, which orders the messages taken from the queues 51-52 accordingly.

TABLE 3

| Messages | Sector-based | Zone based. | Priority Index. |
| --- | --- | --- | --- |
| General page msg | N | Y | 1 |
| BTS Ack Order msg (L2) | Y | N | 2 |
| BTS Ack Order msg (L3) | Y | N | 2 |
| Channel Assignment msg | Y | N | 2 |
| Ext. Channel Assignment msg | Y | N | 2 |
| Feature Notification msg | N | Y | 1 |
| Data Burst | Y | N | 2 |

Preferably, the message priority scheme may be implemented by partitioning the slot space, reserving enough space for higher priority unslotted messages, or sending messages in order of PI in each queue.

With the current scheduling scheme the short messages may be delayed if a large message waits for scheduling in any of the queues. The present invention enables scheduling the shorter messages, if a large message at the head (front) of the queue cannot fit into the slot space. This arrangement improves the overall throughput and also balances the throughput between larger and shorter messages. In particular, the size of the messages in the respective slotted or unslotted queue is checked against the remaining slot space. If the head message is too large, the first message in the queue that fits the remaining slot space is scheduled ahead of the larger message at the head of the queue. If a message that fits the remaining slot space is not found, the scheduler continues with the next slot. If the next slot is free, the larger message is scheduled in this next slot. Larger messages will however be dropped after a few tries to avoid clogging the channel.

The following paragraph summarizes the some simulation results obtained with the method according to the invention.

Simulations show that the performance gain of unslotted message delay increases by a factor of 3 to 7 at 80% channel utilization. Also, the unslotted drop rate and relative drop rate decreases by a factor of 5 at 80% channel utilization. A better performance of the overall drop rate and delay at higher load has been noted. When compared with the conventional method of scheduling large messages, improvements in overall drop rate and delay at high loads, as well as an improvement in slotted drop rate at high load are noted. Thus, the system performance increases with the SMS size, or the SMS penetration, or the number of carriers per PCH.

Because dynamic faire share method of the invention keeps track of the traffic mix, it enables good system performances in terms of delay and drop rate as the channel load increases. The performance is less impacted by the changes in the SMS size, penetration or carrier numbers than those with baseline system. Because the performance at the call setup level depends on unslotted message performance, call failure rate and call setup delay are significantly improved with the method of the invention.

It should be understood that the preferred embodiments mentioned here are merely illustrative of the present invention. Numerous variations in design and use of the present invention may be contemplated in view of the following claims without straying from the intended scope and field of the invention herein disclosed.

Having thus described the invention, what is claimed as new and secured by Letters Patent is:

1. A method for scheduling messages transmitted on a forward common channel of a CDMA system, comprising: at the beginning of each time slot S(i) of said forward common channel arranging all new messages according to a respective call arrival time and a message arrival time into a slotted messages queue SQ and an unslotted messages queue UQ; arranging all repeat all unslotted messages into a repeat unslotted messages queue RUQ; and for said time slot S(i), allocating s % time from the duration of said time slot to slotted messages and u % time from the duration of said time slot to unslotted messages, where s %=A/(A+1), u %=1/(A+1) and A is the ratio of the messages in said SQ to the messages in said UQ.

2. The method of claim 1 wherein said slotted and unslotted messages are scheduled for transmission based on their priority, starting with high priority messages.

3. The method of claim 1 wherein said repeat unslotted messages are scheduled before any new unslotted messages.

4. The method of claim 1 wherein any repeat slotted message is scheduled for transmission before a new slotted message.

5. The method of claim 1 wherein said slotted and unslotted messages are scheduled for transmission based on a priority index PI.

6. A method for scheduling messages transmitted on a forward common channel of a CDMA system, comprising:
   determining the ratio between the slotted and unslotted messages transmitted over said forward common channel over a period of time; and
   for each time slot S(i) of said forward common channel, allocating s % time from the duration of said time slot to slotted messages and u % time from the duration of said time slot to unslotted messages, where s % and u % are determined based on said ratio.

7. The method of claim 6, further comprising:
arranging all new messages according to a respective call arrival time and a message arrival time;
separating said new messages into a slotted messages queue SQ, and an unslotted messages queue UQ; and
arranging all repeat unslotted messages into a repeat unslotted messages queue RUQ.

8. The method of claim 7, wherein said slotted messages are scheduled for transmission in said s % time according to a priority index PI.

9. The method of claim 7, further comprising scheduling unslotted messages from said RUQ and said UQ during said u % time.

10. The method of claim 9, wherein said unslotted messages are scheduled for transmission in said s % time according to said priority index PI.

11. The method of claim 8, further comprising scheduling for transmission a short slotted message positioned in said SQ behind a large slotted message before said long message if said large slotted message is longer than the reminder of said Ps space.

12. The method of claim 10, further comprising scheduling for transmission a short unslotted message positioned in said UQ or said RUQ behind a large unslotted message before said large unslotted message, if said large unslotted message is longer than the reminder of said Ps space.

* * * * *